JOSEPH K. CALDWELL.
Improvement in Burning Hydrocarbons.
No. 4,743. Reissued Feb. 6, 1872.
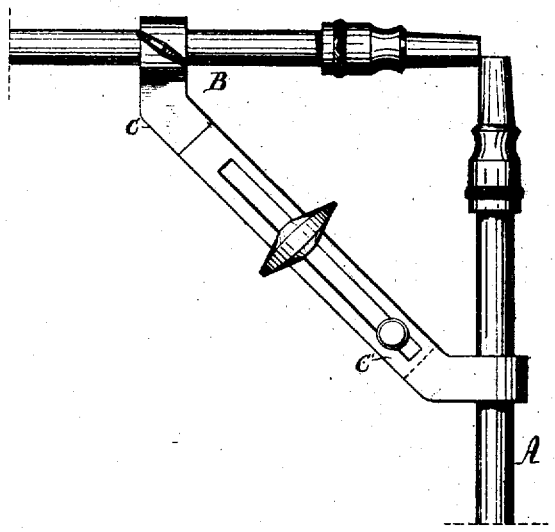
WITNESSES { J. B. Harding
Harry Smith
J. K. Caldwell
By his attys
Howson & Howson

BEST AVAILABLE COPY

UNITED STATES PATENT OFFICE.

JOSEPH K. CALDWELL, OF PHILADELPHIA, PENNSYLVANIA, ASSIGNOR OF PART INTEREST TO ALBERT L. MURPHY, THOMAS M. COANE, JOSEPH N. WITHERS, AND THOMAS CALDWELL.

IMPROVEMENT IN BURNING HYDROCARBONS.

Specification forming part of Letters Patent No. 118,903, dated September 12, 1871; reissue No. 4,743, dated February 6, 1872.

Specification describing an Improved Process of and Apparatus for Burning Petroleum and other Hydrocarbons, invented by JOSEPH KAY CALDWELL, of Philadelphia, county of Philadelphia, and State of Pennsylvania.

*Improved Process of and Apparatus for Burning Petroleum and other equivalent Hydrocarbons.*

My invention consists of a process and apparatus, too fully explained hereafter to need preliminary description, whereby may be produced, by the action of dry or superheated steam on petroleum or other equivalent hydrocarbon, a vapor or spray, which, when ignited, produces a long, widely-diffused flame of intense heat, and free from smoke, the apparatus being such as to always remain unobstructed by tarry and carbonaceous deposits.

The figure in the accompanying drawing will suffice to illustrate the mode of carrying my invention into effect.

A is a tube communicating with any reservoir containing petroleum or other equivalent hydrocarbon; and B a tube communicating with, and receiving dry or superheated steam from, any adjacent steam-generator. Each of these tubes is provided with a nozzle, and the two nozzles are so arranged that the jet of superheated steam escaping from the tube B shall cross the orifice of the nozzle of the tube A, the two tubes being, in the present instance, arranged at right angles to each other. To the tube A is connected a slotted arm, C′, secured, by means of a set-screw, to an arm, C, attached to the tube B, so that the nozzles can be adjusted in respect to each other at pleasure, and secured after adjustment. Other modes of adjusting the nozzles will readily suggest themselves; in fact, the adjustability of the nozzles, although, in some cases, to be preferred, is not indispensable in carrying out my invention; to accomplish which the essentials are a tube or passage for the escape of a jet of dry or superheated steam, which jet shall cross the orifice of another tube or passage communicating with a supply of petroleum or other equivalent hydrocarbon, which can flow through or be reduced by heat to such a condition that it will flow through the tube, it being understood that both orifices are exposed. Each tube is furnished with a suitable cock or valve.

The forcible jet of dry steam from the orifice of the tube B across that of the tube A creates, in the latter tube, sufficient vacuum to induce the petroleum to rise in the tube A; the moment it reaches the orifice of the said tube, however, it is at once forced by the jet of steam into spray, which, being intimately united with the said steam, produces, when ignited, a long and widely-diffused flame of intense heat, this flame leaving no sooty deposit on the object with which it comes in contact, while the orifices are maintained entirely free from carbonaceous and tarry obstructions, which have been, heretofore, the main defects in liquid fuel and hydrocarbon vapor burners.

The freedom of the burner from such obstructions, and the purity of the flame, may be attributed to the fact that the orifices are exposed and not surrounded with any casing which can restrict the free access of air to the flame, or induce the accumulation of tarry deposit on or about the burner.

The above-described mode of generating heat may be applied to furnaces generally, and to any of the usual arts in which a pure flame of great heat is a desideratum.

I claim as my invention—

1. The production of a combustible vapor or spray by causing a forcible jet of dry or superheated steam to cross the exposed orifice of a tube or passage communicating with a supply of petroleum or other equivalent hydrocarbon, substantially in the manner described.

2. The two tubes A and B, provided with nozzles and rendered adjustable in respect to each other, substantially in the manner described.

In testimony whereof I have signed my name to this specification in the presence of two subscribing witnesses.

JOSEPH K. CALDWELL.

Witnesses:
WM. A. STEEL,
H. HOWSON.